United States Patent
Shelat et al.

(10) Patent No.: US 11,941,355 B2
(45) Date of Patent: Mar. 26, 2024

(54) USING OPERATIONAL TRANSFORMS TO PERFORM OPERATIONS ON PARALLEL COPIES OF A DOCUMENT MODEL

(71) Applicant: Google LLC, Mountain View, CA (US)

(72) Inventors: Nishir Shelat, New York, NY (US); Tim Sears, New York, NY (US); Tanuj Sharma, Karnataka (IN); Srivatsan Narayanan, Karnataka (IN); Shruti Jain, Karnataka (IN); Luiz Franca Pereira Filho, Jersey City, NJ (US); Kashish Bansal, Zurich (CH); Julian Rajeshwar, Princeton Junction, NJ (US); Chris Terefinko, New York, NY (US); Asim Fazal, Robbinsville, NJ (US); Archit Gupta, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/836,816

(22) Filed: Jun. 9, 2022

(65) Prior Publication Data
US 2023/0409824 A1    Dec. 21, 2023

(51) Int. Cl.
  *G06F 17/00*    (2019.01)
  *G06F 16/93*    (2019.01)
  (Continued)

(52) U.S. Cl.
  CPC ............ *G06F 40/197* (2020.01); *G06F 16/93* (2019.01); *G06F 40/12* (2020.01); *G06F 40/166* (2020.01); *G06Q 10/101* (2013.01)

(58) Field of Classification Search
  CPC .. G06F 4040/197; G06F 16/93; G06F 40/166; G06F 40/12; G06F 40/103;
  (Continued)

(56) References Cited

U.S. PATENT DOCUMENTS

2007/0255744 A1* 11/2007 Gideoni ............... G06F 16/335
                                                   707/999.102
2009/0319617 A1* 12/2009 Bhakar ............... G06Q 10/107
                                                   709/206
(Continued)

FOREIGN PATENT DOCUMENTS

CN         103605568       2/2014

OTHER PUBLICATIONS

Boelmann, C. et al., "Deterministic Synchronization of Multi-threaded Programs with Operational Transformation"; IEEE International Parallel & Distributed Processing Symposium Workshops; pp. 381-390; dated May 19, 2014.
(Continued)

*Primary Examiner* — Jason T Edwards
(74) *Attorney, Agent, or Firm* — Gray Ice Higdon (57) ABSTRACT

Techniques are described herein for using operational transforms to perform operations on parallel copies of a document model. A method includes: determining that a first operation is to be performed on a second parallel copy; and in response: determining that a revision of a first parallel copy matches a revision of the second parallel copy; and in response: performing the first operation on the second parallel copy to obtain a calculation result including a first list of commands; applying the first list of commands to the second parallel copy; performing an operational transform on at least one command in the first list of commands based on queued user edits to the first parallel copy, the queued user edits including a second list of commands, to obtain a transformed list of commands; and applying the transformed list of commands to the first parallel copy.

20 Claims, 6 Drawing Sheets

(51) Int. Cl.
*G06F 40/12* (2020.01)
*G06F 40/166* (2020.01)
*G06F 40/197* (2020.01)
*G06Q 10/101* (2023.01)

(58) Field of Classification Search
CPC .... G06F 40/123; G06F 16/176; G06F 40/151; G06F 40/197; G06Q 10/101
USPC .......................................................... 715/229
See application file for complete search history.

(56) References Cited

U.S. PATENT DOCUMENTS

| | | | |
|---|---|---|---|
| 2011/0252312 A1 | 10/2011 | Lemonik | |
| 2015/0193734 A1* | 7/2015 | Karve | G06Q 10/10 709/205 |
| 2015/0199328 A1 | 7/2015 | Danziger et al. | |
| 2016/0070741 A1* | 3/2016 | Lin | G06F 16/183 707/638 |
| 2016/0321225 A1* | 11/2016 | Keslin | G06F 40/197 |
| 2020/0310863 A1 | 10/2020 | Wong | |
| 2021/0133253 A1* | 5/2021 | Underwood | G06F 40/103 |

OTHER PUBLICATIONS

Li, R. et al., "A New Operational Transformation Framework for Real-Time Group Editors"; IEEE Transactions on Parallel and Distributed Systems; vol. 18, No. 3; pp. 307-319; dated Mar. 1, 2007.

Wikipedia, "Operational Transformation"; internet citation, retrieved from internet: URL:http://web.archive.org/web/20100518122208/http://en.wikipedia.org/wiki/Operational_transformation [retrieved on Nov. 15, 2012]; 11 pages; last modified on May 18, 2010.

Ku, Y. et al., "Achieving Convergence in Operational Transformation: Conditions, Mechanisms and Systems"; In Proceedings of the 17th ACM conference on Computer Supported Cooperative Work & Social Computing ; pp. 505-518; dated Feb. 15, 2014.

European Patent Office; International Search Report and Written Opinion issued in Application No. PCT/US2022/052292; 13 pages; dated Apr. 18, 2023.

"Operational transformation" Wikipedia. Retreived from https://en.wikipedia.org/wiki/Operational_transformation, 11 pages, dated Apr. 27, 2022.

* cited by examiner

USING OPERATIONAL TRANSFORMS TO PERFORM OPERATIONS ON PARALLEL COPIES OF A DOCUMENT MODEL

BACKGROUND

Collaborative online document editors (e.g., text editor applications, spreadsheet applications, presentation applications, etc.) may allow multiple users to collaboratively create, view, and edit documents. For example, a collaborative online text editor application may allow users who are members of a particular team within a company or other organization to collaborate on a particular document by making edits (e.g., revisions) to the document in a synchronous manner and/or in an asynchronous manner. Likewise, a collaborative online spreadsheet application may allow users to collaborate on a particular spreadsheet by making edits (e.g., revisions) to a spreadsheet in a synchronous manner and/or in an asynchronous manner, and a collaborative online presentation application may allow users to collaborate on a particular presentation by making edits (e.g., revisions) to slides in a slideshow in a synchronous manner and/or in an asynchronous manner.

A document that is created, viewed, and/or edited using a document editor (e.g., a text editor application, a spreadsheet application, a presentation application, etc.) may be represented using a document model. The document model may include data that represents the physical and/or semantic structure, content, and/or other properties of the document. A document editor may process the document model to render the document in a user interface of the document editor. When a user uses a document editor to create a new document, the document editor may create a new document model that represents the new document. When a user uses a document editor to edit (modify) an existing document, the document editor may modify a document model that represents the existing document.

A document editor may perform various synchronous operations that process a document model, generate commands to modify the document model, and apply those commands to the document model. These operations may be performed responsive to one or more edits received, via a user interface, from a user of a document editor (e.g., a user may type a formula into a cell in a spreadsheet which may initiate a calculation operation, initiate a document save operation by selecting a "save" command on a menu, etc.). Alternatively, these operations may be performed responsive to one or more edits received from another user who is collaboratively editing the document using another instance of the document editor. In other cases, these operations may be initiated by the document editor (e.g., an autosave operation or spellcheck operation that is performed at a predetermined interval, or in response to user edit(s)).

During periods of time when a document editor is performing various synchronous operations on a document model, a frame rate of a user interface rendered by the document editor may decrease (drop), causing the user interface of the document editor to appear unresponsive ("frozen") to a user until the frame rate increases (e.g., to a "normal" or "usual" frame rate) after completion of the synchronous operation. Occurrences of frame rate drops can lead to a negative user experience. Additionally, occurrences of frame rate drops can extend an amount of time taken by a user to complete, via a user interface of a document editor, editing tasks and/or other tasks with respect to a document and, as a result, can lead to excess usage of power resources and/or other computational resource(s) of a client device on which the document editor is running.

SUMMARY

Implementations disclosed herein relate to using operational transforms to perform operations on parallel copies of a document model. In some implementations, a document editor renders a document in a user interface using a first parallel copy of a document model that is maintained by a first thread of the document editor. One or more operations may be offloaded to a second parallel copy of the document model that is maintained by a second thread (e.g., a worker thread) of the document editor.

In some implementations, a communication system (e.g., a worker communication manager) in the first thread queues operations (worker tasks), transmits the queued operations from the first thread to the second thread to be performed on the second parallel copy of the document model that is maintained by the second thread (e.g., at a guaranteed revision/version of the document model), and then applies the results of the operations to the second parallel copy of the document model. The worker communication manager then operationally transforms the results against queued user edits and applies the operationally transformed results to the first parallel copy of the document model. By operationally transforming the result of a particular operation, the worker communication manager may avoid overwriting user edits that followed the particular operation and therefore take precedence.

In some implementations, by offloading one or more operations to the second thread (worker thread), to be performed on the second parallel copy of the document model, the system may avoid or minimize occurrences of frame rate drops associated with performing various synchronous operations in the same thread and on the same copy of the document model that is used by the document editor to render the document in the user interface of the document editor. By avoiding or minimizing frame rate drops, implementations may improve a user experience and reduce the amount of time taken by a user to complete, via a user interface of a document editor, editing tasks and/or other tasks with respect to a document and, as a result, reduce usage of power resources and/or other computational resource(s) of a client device on which the document editor is running.

In some implementations, each operation (worker task) that is queued by the worker communication manager is represented by a task configuration. The task configuration may include information (e.g., metadata) about (1) what the operation will do to the document model, (2) how the operation should be serialized for transmission (e.g., from the first thread to the second thread), (3) whether or not the second thread (worker thread) is to be locked during performance of the operation, (4) whether or not execution of the operation in the second thread generates results to be sent back to the first thread (main thread), (5) whether or not the operation can be merged with another operation in the queue, and/or (6) whether or not the operation can be reordered with other operations in the queue.

In an example, an operation (e.g., a calculation operation) that is expensive (e.g., in time required for execution) may be executed in the second thread (worker thread), and the results of the operation may be applied to both the second parallel copy of the document model that is maintained by the second thread and the first parallel copy of the document model that is maintained by the first thread (main thread).

When calculation is requested, the worker communication manager transmits a calculation operation to the second thread, which starts executing the calculation operation on the second parallel copy of the document model. During this process, the first thread is idle, so the user is able to make edits, via the user interface, to the first parallel copy of the document model that is maintained by the first thread, while avoiding or minimizing frame rate drop in the user interface. These user edits (a list of commands) are queued by the worker communication manager since the second thread is busy executing the calculation operation. When the second thread completes execution of the calculation operation, the calculation results (a list of commands) are applied to the second parallel copy of the document model that is maintained by the second thread and transmitted back to the first thread. On the first thread, the worker communication manager operationally transforms the incoming calculation result commands against the queued user edit commands, to ensure that the calculation results do not overwrite the user edits which came after the calculation operation and therefore take precedence.

The incoming calculation result commands may "conflict" with one or more of the queued user edit commands. For example, a queued user edit command may specify numerical values for a first set of cells in a spreadsheet, and the incoming calculation result commands may specify numerical values for a second set of cells in the spreadsheet, where the first set of cells and the second set of cells partially overlap. A conflict occurs for a cell included in both the first set of cells and the second set of cells when the numerical value for the cell specified by the queued user edit command is different from the numerical value for the cell specified by the incoming calculation result command.

In some implementations, the worker communication manager uses operational transforms to resolve such conflicts. Incoming calculation result commands may be operationally transformed based on the queued user edit commands before being applied to the first parallel copy of the document model. Continuing the above example, the incoming calculation result commands may be transformed to generate transformed calculation result commands, thereby modifying the result of the calculation operation based on the user edit to the cell included in both the first set of cells and the second set of cells. The transformed calculation result commands are then applied to the first parallel copy of the document model.

In some implementations, the worker communication manager sends a model checksum with an operation that is sent to the second thread (worker thread), the model checksum representing a current revision of the first parallel copy of the document model, at a time when the operation was requested. The second thread may compare this checksum with a model checksum representing a current revision of the second parallel copy of the document model, in order to validate that the second parallel copy of the document model is at the same revision as the first parallel copy of the document model, at the time when the operation was requested.

In some implementations, the worker communication manager supports merging operations whose task configurations indicate they are mergeable. For example, two queued operations each representing a set of user edits can be merged with each other so that only one task containing all the edits is transmitted to the second thread. In some implementations, the worker communication manager may improve performance of a document editor by eliminating unnecessary transmissions of operations to the second thread. In some implementations, the worker communication manager may also support reordering operations. For example, the task configuration associated with a particular operation may specify how/when each operation may be reordered relative to other operations in the queue.

In some implementations, the worker communication manager may track the amount of time it takes for each operation to wait in the queue, be serialized for transmission, execute on the second thread, have its results transformed against any queued operations, and have the transformation applied to the first parallel copy of the document model. The worker communication manager may time out an operation if the time to perform the operation exceeds a configurable timeout, to avoid starving other operations in the queue.

In some implementations, the system may be used to offload operations to a separate thread, thereby improving the user experience during expensive operations. The worker communication manager may support any operation that generates results as lists of commands, so it can be used for many operations that are executed on a document model. In an example, the worker communication manager may be used to offload operations including processing spreadsheet formulas, generating spelling and/or grammar suggestions, applying filters to images, validating content correctness, and/or serializing a document model to be uploaded or downloaded.

In various implementations, a method implemented by one or more processors may include: identifying a first operation to be performed on a document model, where, in a first thread, a document is rendered in a user interface using a first parallel copy of the document model that is maintained by the first thread; determining that the first operation is to be performed, in a second thread, on a second parallel copy of the document model that is maintained by the second thread; and in response to determining that the first operation is to be performed, in the second thread, on the second parallel copy of the document model: determining that a revision of the first parallel copy of the document model matches a revision of the second parallel copy of the document model; and in response to determining that the revision of the first parallel copy of the document model matches the revision of the second parallel copy of the document model: performing, in the second thread, the first operation on the second parallel copy of the document model to obtain a calculation result of the first operation, the calculation result including a first list of commands; applying, in the second thread, the first list of commands to the second parallel copy of the document model; performing an operational transform on at least one command in the first list of commands based on queued user edits to the first parallel copy of the document model, the queued user edits including a second list of commands, to obtain a transformed list of commands; and applying, in the first thread, the transformed list of commands to the first parallel copy of the document model.

In some implementations, determining that the revision of the first parallel copy of the document model matches the revision of the second parallel copy of the document model includes determining that a first checksum based on the first parallel copy of the document model matches a second checksum based on the second parallel copy of the document model.

In some implementations, the queued user edits are based on edits to the document that are made by a user subsequent to identifying the first operation to be performed on the document model.

In some implementations, the method further includes: identifying a second operation to be performed on the document model and a third operation to be performed on the document model; and determining that the second operation and the third operation are mergeable into the first operation. Identifying the first operation to be performed on the document model may include, in response to determining that the second operation and the third operation are mergeable into the first operation, generating the first operation by merging the second operation and the third operation.

In some implementations, the method further includes: identifying a second operation to be performed on the document model, where the second operation precedes the first operation in a queue; and determining that the first operation may be reordered in the queue such that the first operation precedes the second operation. Identifying the first operation to be performed on the document model may include, in response to determining that the first operation may be reordered in the queue such that the first operation precedes the second operation, reordering the first operation in the queue such that the first operation precedes the second operation.

In some implementations, the method further includes: identifying a second operation to be performed on the document model; determining that the second operation is to be performed, in the second thread, on the second parallel copy of the document model; and in response to determining that the second operation is to be performed, in the second thread, on the second parallel copy of the document model: determining that the revision of the first parallel copy of the document model matches the revision of the second parallel copy of the document model; and in response to determining that the revision of the first parallel copy of the document model matches the revision of the second parallel copy of the document model: initiating, in the second thread, performance of the second operation on the second parallel copy of the document model; determining that the performance of the second operation has not been completed within a threshold period of time; and in response to determining that the performance of the second operation has not been completed within the threshold period of time, terminating the performance of the second operation.

In some implementations, the method further includes: identifying a second operation to be performed on the document model; determining that the second operation is to be performed, in the second thread, on the second parallel copy of the document model; and in response to determining that the second operation is to be performed, in the second thread, on the second parallel copy of the document model: determining that the revision of the first parallel copy of the document model no longer matches the revision of the second parallel copy of the document model; and in response to determining that the revision of the first parallel copy of the document model no longer matches the revision of the second parallel copy of the document model, reloading, from a saved version, the first parallel copy of the document model and the second parallel copy of the document model, and removing the second operation from a queue.

In some additional or alternative implementations, a computer program product may include one or more computer-readable storage media having program instructions collectively stored on the one or more computer-readable storage media. The program instructions may be executable to: identify a first operation to be performed on a document model, where, in a first thread, a document is rendered in a user interface using a first parallel copy of the document model that is maintained by the first thread; determine that the first operation is to be performed, in a second thread, on a second parallel copy of the document model that is maintained by the second thread; and in response to determining that the first operation is to be performed, in the second thread, on the second parallel copy of the document model: determine that a checksum of the first parallel copy of the document model matches a checksum of the second parallel copy of the document model; and in response to determining that the checksum of the first parallel copy of the document model matches the checksum of the second parallel copy of the document model: initiate, in the second thread, performance of the first operation on the second parallel copy of the document model; queue a first list of commands based on at least one edit to the document that is received subsequent to initiating the performance of the first operation; obtain, in the second thread, a calculation result of the first operation, the calculation result including a second list of commands; apply, in the second thread, the second list of commands to the second parallel copy of the document model; perform an operational transform on at least one command in the second list of commands based on the first list of commands that is queued, to obtain a transformed list of commands; and apply, in the first thread, the transformed list of commands to the first parallel copy of the document model.

In some implementations, the checksum of the first parallel copy of the document model corresponds to a particular revision of the first parallel copy of the document model and the checksum of the second parallel copy of the document model corresponds to a particular revision of the second parallel copy of the document model.

In some additional or alternative implementations, a system may include a processor, a computer-readable memory, one or more computer-readable storage media, and program instructions collectively stored on the one or more computer-readable storage media. The program instructions may be executable to: identify a first operation to be performed on a document model, where, in a first thread, a document is rendered in a user interface using a first parallel copy of the document model that is maintained by the first thread; determine that the first operation is to be performed, in a second thread, on a second parallel copy of the document model that is maintained by the second thread; and in response to determining that the first operation is to be performed, in the second thread, on the second parallel copy of the document model: determine that a revision of the first parallel copy of the document model matches a revision of the second parallel copy of the document model; and in response to determining that the revision of the first parallel copy of the document model matches the revision of the second parallel copy of the document model: perform, in the second thread, the first operation on the second parallel copy of the document model to obtain a calculation result of the first operation, the calculation result including a first list of commands; apply, in the second thread, the first list of commands to the second parallel copy of the document model; perform an operational transform on at least one command in the first list of commands based on queued user edits to the first parallel copy of the document model, the queued user edits including a second list of commands, to obtain a transformed list of commands; and apply, in the first thread, the transformed list of commands to the first parallel copy of the document model.

The above description is provided as an overview of some implementations of the present disclosure. Further description of those implementations, and other implementations, are described in more detail below.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s))) to perform a method such as one or more of the methods described herein. Other implementations can include a client device that includes processor(s) operable to execute stored instructions to perform a method, such as one or more of the methods described herein. Yet other implementations can include a system of one or more servers that include one or more processors operable to execute stored instructions to perform a method such as one or more of the methods described herein.

DETAILED DESCRIPTION

Figure 1:
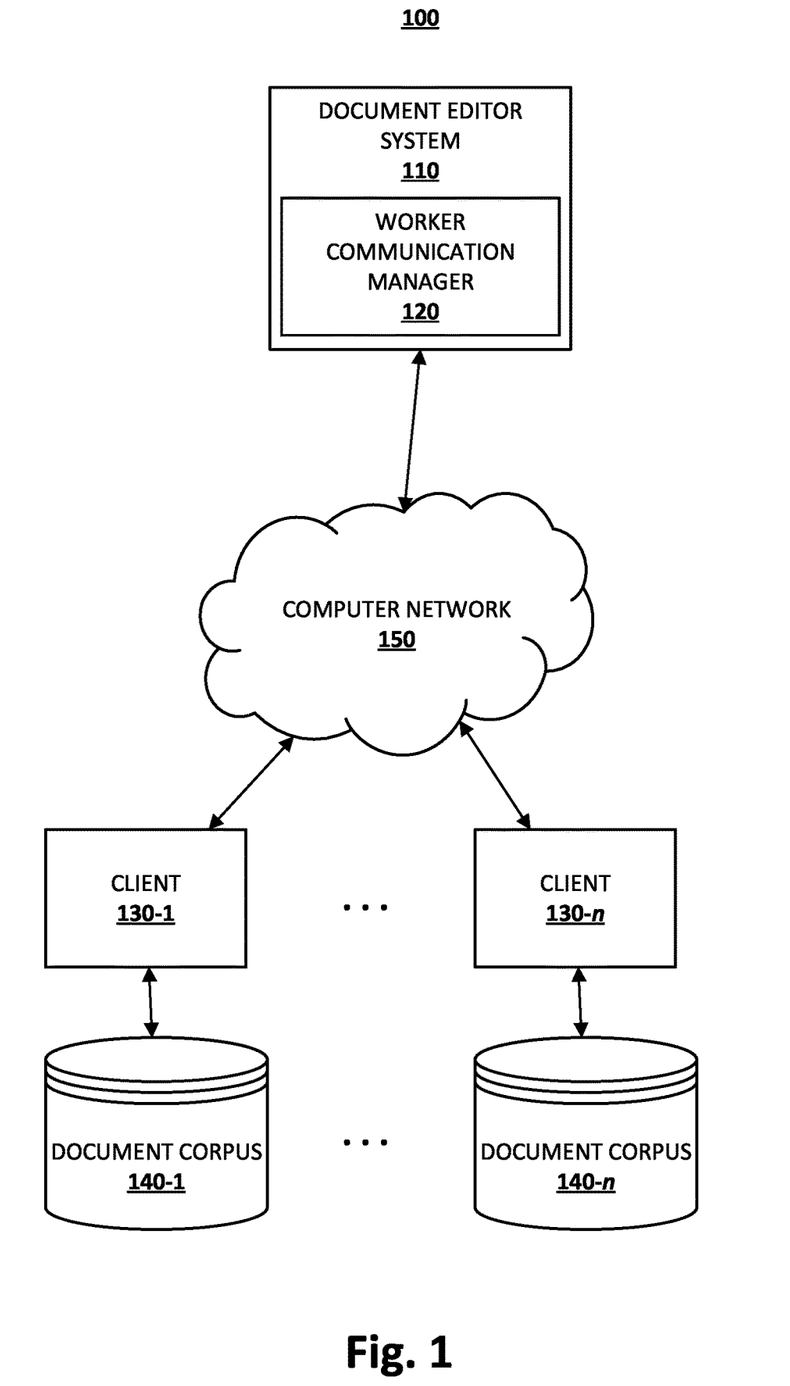
FIG. 1 schematically depicts an example environment in which selected aspects of the present disclosure may be implemented, in accordance with various implementations.

FIG. 1 schematically depicts an example environment 100 in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs") that execute computer-readable instructions stored in memory, or other types of logic such as application-specific integrated circuits ("ASIC"), field-programmable gate arrays ("FPGA"), and so forth. Some of the systems depicted in FIG. 1, such as a document editor system 110, may be implemented using one or more server computing devices that form what is sometimes referred to as a "cloud infrastructure," although this is not required.

In implementations, the environment 100 may include a document editor system 110 that implements a document editor application that is accessible from various clients, including clients 130-1, . . . , 130-n that may be included in the environment 100, through either a thin client interface, such as a web browser (e.g., a web-based document editor application), or a program interface. In implementations, the document editor application that is implemented by the document editor system 110 may be a software as a service (SaaS) document editor application. The document editor system 110 and the clients 130-1, . . . , 130-n may be in communication via a computer network 150, which may be any suitable network including any combination of a local area network (LAN), wide area network (WAN), or the Internet. The document editor system 110 may include, among other things, a worker communication manager 120 that is configured to perform selected aspects of the present disclosure in order to use operational transforms to perform operations on parallel copies of a document model representing a document that is created, modified, and/or viewed using one or more of the clients 130-1, . . . , 130-n.

Each of the clients 130-1, . . . , 130-n may be, for example, a user computing device that is used by a user to access a document editor application via a document editor application user interface, such as a SaaS document editor application, that is provided by the document editor system 110, e.g., through a web browser. In an example, the clients 130-1, . . . , 130-n may be user computing devices associated with an individual or an entity or organization such as a business (e.g., financial institute, bank, etc.), non-profit, club, university, government agency, or any other organization that uses a document editor application. For example, a business may operate a document editor application to create, modify, and/or view one or more documents to manage financial records, business records, client lists, and so forth.

In various implementations, the environment 100 may include document corpuses 140-1, . . . , 140-n that are accessible to the clients 130-1, . . . , 130-n via the computer network 150 or another network. Each of the document corpuses 140-1, . . . , 140-n may include multiple documents created by one or more of the clients 130-1, . . . , 130-n, e.g., using the document editor system 110. In an example, the document corpuses 140-1, . . . , 140-n may include a set of documents created, edited, or viewed by users of one or more of the clients 130-1, . . . , 130-n associated with a particular entity or organization.

The worker communication manager 120 may be configured to queue operations, transmit the queued operations from a first thread of the document editor application provided by the document editor system 110 to a second thread of the document editor application to be performed on a second parallel copy of a document model that is maintained by the second thread, and then apply the results of the operations to the second parallel copy of the document model. The worker communication manager 120 may then operationally transform the results against queued user edits and apply the operationally transformed results to a first parallel copy of the document model that is maintained by the first thread.

Figure 2:
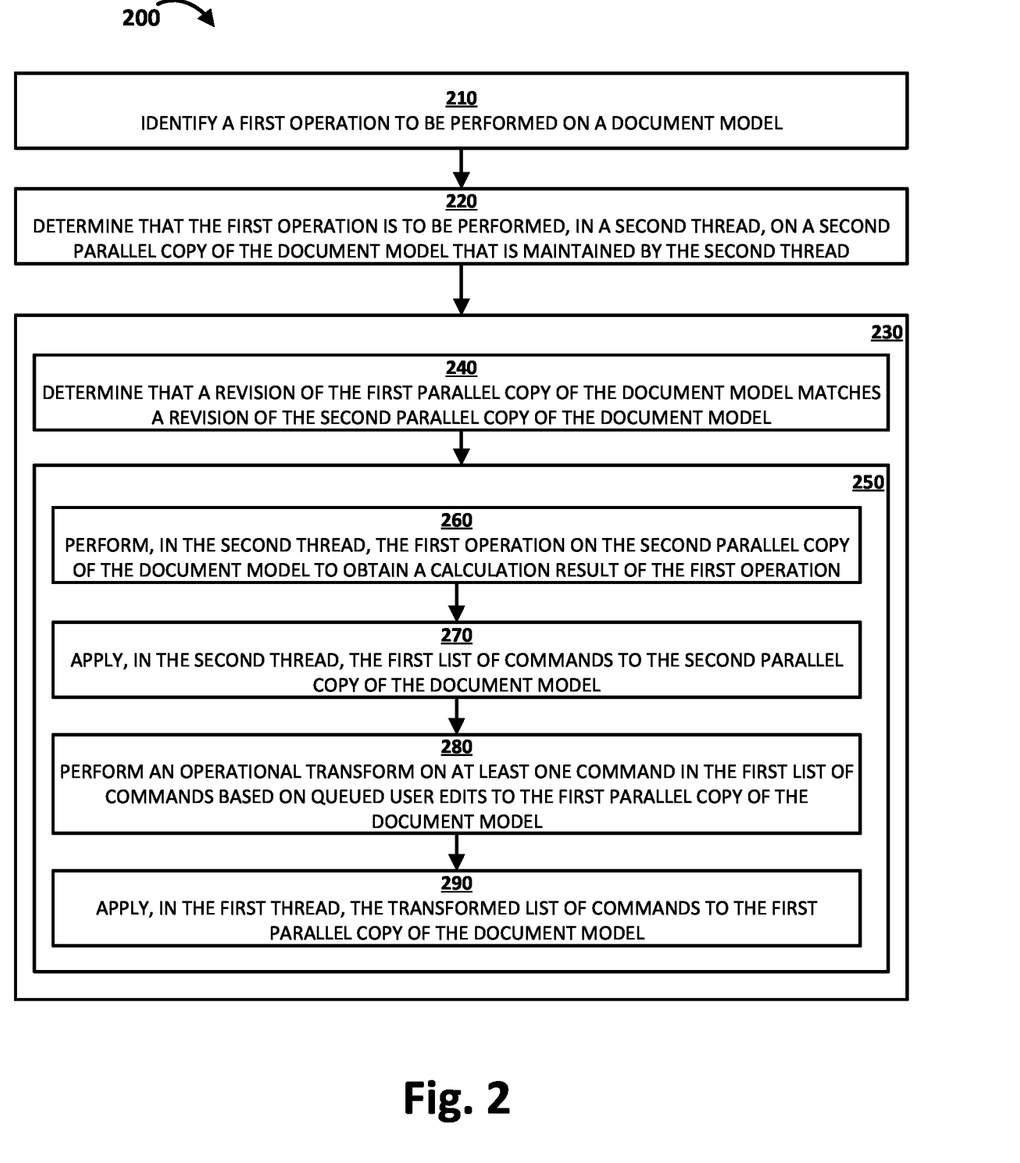
FIG. 2 depicts a flowchart illustrating an example method for practicing selected aspects of the present disclosure.

FIG. 2 depicts a flowchart illustrating an example method 200 of using operational transforms to perform operations on parallel copies of a document model. For convenience, the operations of the method 200 are described with reference to a system that performs the operations. This system of method 200 may include various components of various computer systems, such as one or more components of the document editor system 110. Moreover, while operations of method 200 are shown in a particular order, this is not meant to be limiting. One or more operations may be reordered, omitted, or added.

At block 210, the system may identify a first operation to be performed on a document model. In some implementations, in a first thread of a document editor application provided by the document editor system 110, a document may be rendered for display in a user interface that is displayed on a display of one of the clients 130-1, . . . , 130-n, using a first parallel copy of the document model that is maintained by the first thread. In some implementations, the worker communication manager 120 of the document editor system 110 may identify the first operation to be performed on the document model. The first operation may be an operation to be performed responsive to one or more edits received, via the user interface, from a user of a document editor application (e.g., a user may type a formula into a cell in a spreadsheet which may initiate a calculation operation, initiate a document save operation by selecting a "save" command on a menu, etc.). Alternatively, the first operation may be an operation to be performed responsive to one or more edits received from another user who is collaboratively editing the document using another instance of the document editor application provided by the document editor system 110. In other cases, the first operation may be initiated by the document editor application (e.g., an autosave operation or spellcheck operation that is performed at a predetermined interval, or in response to user edit(s)).

Still referring to block 210, in some implementations, the system may identify a second operation to be performed on the document model and a third operation to be performed on the document model, and determine that the second operation and the third operation are mergeable into the first operation. In some implementations, identifying the first operation to be performed on the document model may include, in response to determining that the second operation and the third operation are mergeable into the first operation, generating the first operation by merging the second operation and the third operation.

Still referring to block 210, in some implementations, the system may identify a second operation to be performed on the document model, where the second operation precedes the first operation in a queue, and determine that the first operation may be reordered in the queue such that the first operation precedes the second operation. In some implementations, identifying the first operation to be performed on the document model may include, in response to determining that the first operation may be reordered in the queue such that the first operation precedes the second operation, reordering the first operation in the queue such that the first operation precedes the second operation.

Still referring to FIG. 2, at block 220, the system may determine that the first operation is to be performed, in a second thread, on a second parallel copy of the document model that is maintained by the second thread. In some implementations, the worker communication manager 120 of the document editor system 110 may determine that the first operation identified at block 210 is to be performed, in the second thread of the document editor application provided by the document editor system 110, on the second parallel copy of the document model that is maintained by the second thread.

In some implementations, the worker communication manager 120 may determine that the first operation is to be performed in the second thread on the second parallel copy of the document model based on a task configuration corresponding to the first operation. The task configuration may include information (e.g., metadata) about (1) what the operation will do to the document model, (2) how the operation should be serialized for transmission (e.g., from the first thread to the second thread), (3) whether or not the second thread (worker thread) is to be locked during performance of the operation, (4) whether or not execution of the operation in the second thread generates results to be sent back to the first thread (main thread), (5) whether or not the operation can be merged with another operation in the queue, and/or (6) whether or not the operation can be reordered with other operations in the queue.

In some implementations, at block 220, based on determining that the first operation is to be performed in the second thread on the second parallel copy of the document model, the worker communication manager 120 may serialize the first operation based on the task configuration and transmit the first operation along with a checksum to the second thread. The checksum may represent a current revision of the first parallel copy of the document model, at a time when the first operation was requested.

Still referring to FIG. 2, at block 230, in response to determining that the first operation is to be performed, in the second thread, on the second parallel copy of the document model, the system performs the functions of blocks 240 and 250. In some implementations, the worker communication manager 120 of the document editor system 110 performs the functions of blocks 240 and 250 in response to determining that the first operation is to be performed, in the second thread, on the second parallel copy of the document model at block 220.

At block 240, the system determines that a revision of the first parallel copy of the document model matches a revision of the second parallel copy of the document model. In some implementations, at block 240, the worker communication manager 120 of the document editor system 110 determines that the revision of the first parallel copy of the document model matches the revision of the second parallel copy of the document model based on a comparison of the transmitted checksum from block 220 and a checksum that represents a current revision of the second parallel copy of the document model. If such comparison indicates that the two checksums match, the worker communication manager 120 validates the second parallel copy of the document model as being at the same revision as the first parallel copy of the document model, at the time when the first operation was requested.

At block 250, in response to determining that the revision of the first parallel copy of the document model matches the revision of the second parallel copy of the document model, the system performs the functions of blocks 260, 270, 280, and 290. In some implementations, the worker communication manager 120 of the document editor system 110 performs the functions of blocks 260, 270, 280, and 290 in response to determining that the revision of the first parallel copy of the document model matches the revision of the second parallel copy of the document model at block 240.

At block 260, the system performs, in the second thread, the first operation on the second parallel copy of the document model to obtain a calculation result of the first operation, the calculation result including a first list of commands. In some implementations, the worker communication manager 120 of the document editor system 110 causes the first operation to be performed on the second parallel copy of the document model, to obtain a calculation result of the first operation. The calculation result may include a first list of commands.

At block 270, the system applies, in the second thread, the first list of commands to the second parallel copy of the document model. In some implementations, the worker communication manager 120 of the document editor system 110 causes the first list of commands, obtained at block 260, to be applied, in the second thread, to the second parallel copy of the document model.

At block 280, the system performs an operational transform on at least one command in the first list of commands based on queued user edits to the first parallel copy of the document model, the queued user edits including a second list of commands, to obtain a transformed list of commands. In some implementations, the worker communication manager 120 of the document editor system 110 causes the first list of commands to be serialized and transmitted to the first thread. The worker communication manager 120 may perform the operational transform on at least one command in the first list of commands that is transmitted to the first thread, based on the queued user edits including the second list of commands, to obtain the transformed list of commands. In some implementations, the queued user edits are based on edits to the document that are made by a user subsequent to identifying the first operation to be performed on the document model.

At block 290, the system applies, in the first thread, the transformed list of commands to the first parallel copy of the document model. In some implementations, the worker communication manager 120 of the document editor system 110 applies, in the first thread, the transformed list of commands, obtained at block 280, to the first parallel copy of the document model.

Figure 3:
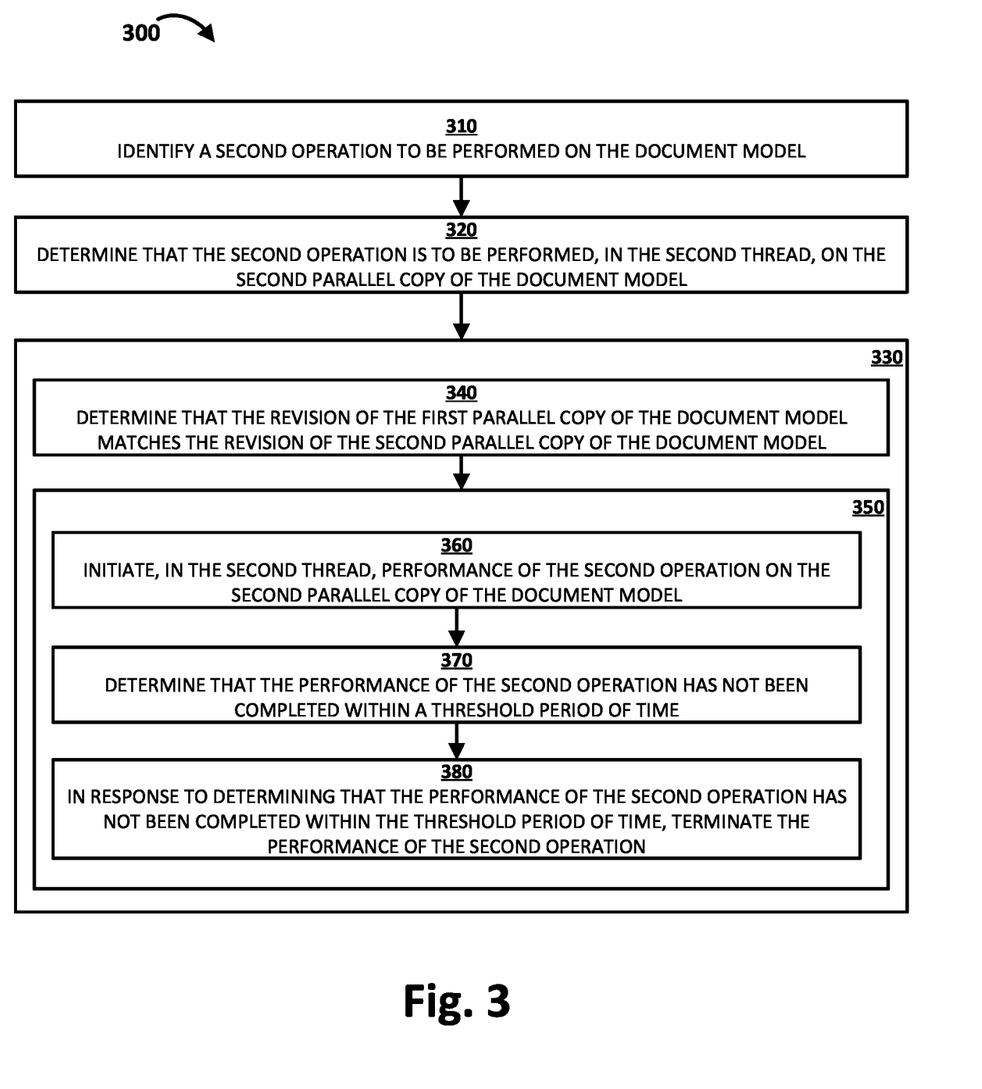
FIG. 3 depicts another flowchart illustrating an example method for practicing selected aspects of the present disclosure.

FIG. 3 depicts a flowchart illustrating an example method 300 of using operational transforms to perform operations on parallel copies of a document model. For convenience, the operations of the method 300 are described with reference to a system that performs the operations. This system of method 300 may include various components of various computer systems, such as one or more components of the document editor system 110. Moreover, while operations of method 300 are shown in a particular order, this is not meant to be limiting. One or more operations may be reordered, omitted, or added. The operations of method 300 may be performed subsequent to the operations of block 290 of FIG. 2.

At block 310, the system may identify a second operation to be performed on the document model. In some implementations, the worker communication manager 120 of the document editor system 110 may identify the second operation to be performed on the document model. The second operation may be an operation to be performed responsive to one or more edits received, via the user interface, from a user of a document editor application (e.g., a user may type a formula into a cell in a spreadsheet which may initiate a calculation operation, initiate a document save operation by selecting a "save" command on a menu, etc.). Alternatively, second operation may be an operation to be performed responsive to one or more edits received from another user who is collaboratively editing the document using another instance of the document editor application provided by the document editor system 110. In other cases, the second operation may be initiated by the document editor application (e.g., an autosave operation or spellcheck operation that is performed at a predetermined interval, or in response to user edit(s)).

At block 320, the system may determine that the second operation is to be performed, in the second thread, on the second parallel copy of the document model. In some implementations, the worker communication manager 120 of the document editor system 110 may determine that the second operation identified at block 310 is to be performed, in the second thread of the document editor application provided by the document editor system 110, on the second parallel copy of the document model that is maintained by the second thread. In some implementations, the worker communication manager 120 may determine that the second operation is to be performed in the second thread on the second parallel copy of the document model based on a task configuration corresponding to the second operation.

In some implementations, at block 320, based on determining that the second operation is to be performed in the second thread on the second parallel copy of the document model, the worker communication manager 120 may serialize the second operation based on the task configuration and transmit the second operation along with a checksum to the second thread. The checksum may represent a current revision of the first parallel copy of the document model, at a time when the second operation was requested.

Still referring to FIG. 3, at block 330, in response to determining that the second operation is to be performed, in the second thread, on the second parallel copy of the document model, the system performs the functions of blocks 340 and 350. In some implementations, the worker communication manager 120 of the document editor system 110 performs the functions of blocks 340 and 350 in response to determining that the second operation is to be performed, in the second thread, on the second parallel copy of the document model at block 320.

At block 340, the system determines that the revision of the first parallel copy of the document model matches the revision of the second parallel copy of the document model. In some implementations, at block 340, the worker communication manager 120 of the document editor system 110 determines that the revision of the first parallel copy of the document model matches the revision of the second parallel copy of the document model based on a comparison of the transmitted checksum from block 320 and a checksum that represents a current revision of the second parallel copy of the document model. If such comparison indicates that the two checksums match, the worker communication manager 120 validates the second parallel copy of the document model as being at the same revision as the first parallel copy of the document model, at the time when the second operation was requested.

At block 350, in response to determining that the revision of the first parallel copy of the document model matches the revision of the second parallel copy of the document model, the system performs the functions of blocks 360, 370, and 380. In some implementations, the worker communication manager 120 of the document editor system 110 performs the functions of blocks 360, 370, and 380 in response to determining that the revision of the first parallel copy of the document model matches the revision of the second parallel copy of the document model at block 340.

At block 360, the system initiates, in the second thread, performance of the second operation on the second parallel copy of the document model. In some implementations, the worker communication manager 120 of the document editor system 110 causes performance of the second operation to be initiated, in the second thread, on the second parallel copy of the document model.

At block 370, the system determines that the performance of the second operation has not been completed within a threshold period of time. In some implementations, the worker communication manager 120 of the document editor system 110 determines that the performance of the second operation has not been completed within a threshold period of time. The worker communication manager 120 may determine the threshold period of time based on a task configuration corresponding to the second operation, based upon a maximum expected time to complete the performance of the second operation, based upon a configuration setting, or based upon any other criteria.

At block 380, in response to determining that the performance of the second operation has not been completed within the threshold period of time, the system terminates the performance of the second operation. In some implementations, in response to determining, at block 370, that the performance of the second operation has not been completed within the threshold period of time, the worker communication manager 120 of the document editor system 110 terminates the performance of the second operation.

Still referring to block 380, in some implementations, the worker communication manager 120 of the document editor system 110 may cause an error to be displayed on the user interface and/or may reload, from a saved version, the first parallel copy of the document model and the second parallel copy of the document model, and remove the second operation from a queue.

Figure 4:
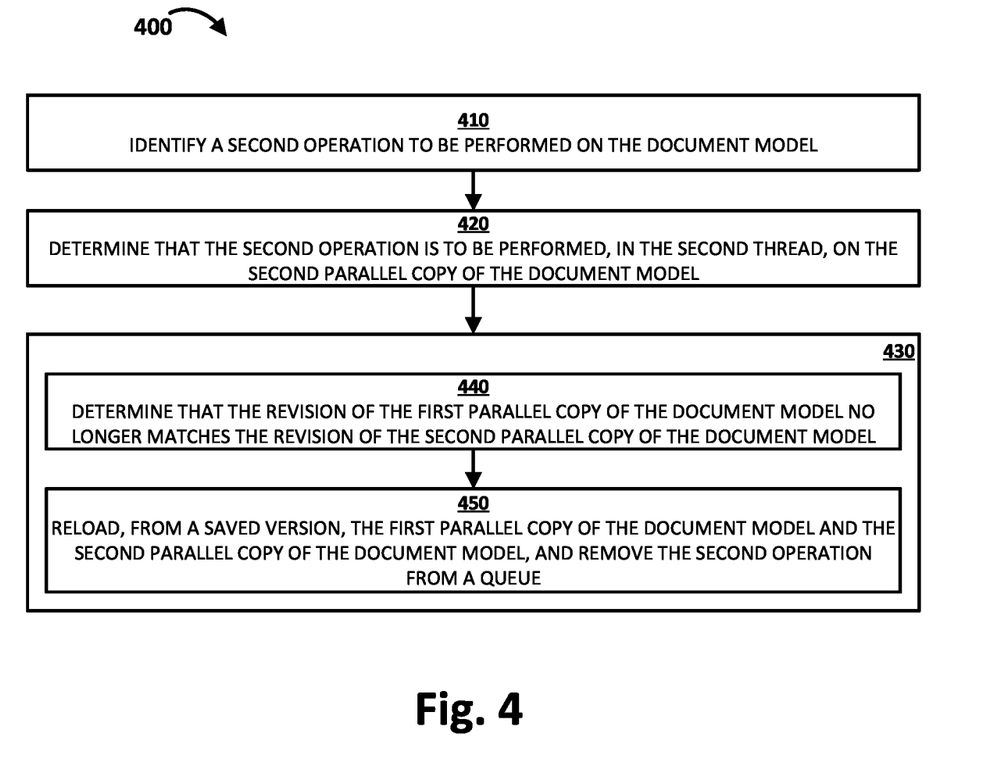
FIG. 4 depicts another flowchart illustrating an example method for practicing selected aspects of the present disclosure.

FIG. 4 depicts a flowchart illustrating an example method 400 of using operational transforms to perform operations on parallel copies of a document model. For convenience, the operations of the method 400 are described with reference to a system that performs the operations. This system of method 400 may include various components of various computer systems, such as one or more components of the document editor system 110. Moreover, while operations of method 400 are shown in a particular order, this is not meant to be limiting. One or more operations may be reordered, omitted, or added. The operations of method 400 may be performed subsequent to the operations of block 290 of FIG. 2.

At block 410, the system may identify a second operation to be performed on the document model. In some implementations, the worker communication manager 120 of the document editor system 110 may identify the second operation to be performed on the document model. The second operation may be an operation to be performed responsive to one or more edits received, via the user interface, from a user of a document editor application (e.g., a user may type a formula into a cell in a spreadsheet which may initiate a calculation operation, initiate a document save operation by selecting a "save" command on a menu, etc.). Alternatively, second operation may be an operation to be performed responsive to one or more edits received from another user who is collaboratively editing the document using another instance of the document editor application provided by the document editor system 110. In other cases, the second operation may be initiated by the document editor application (e.g., an autosave operation or spellcheck operation that is performed at a predetermined interval, or in response to user edit(s)).

At block 420, the system may determine that the second operation is to be performed, in the second thread, on the second parallel copy of the document model. In some implementations, the worker communication manager 120 of the document editor system 110 may determine that the second operation identified at block 410 is to be performed, in the second thread of the document editor application provided by the document editor system 110, on the second parallel copy of the document model that is maintained by the second thread. In some implementations, the worker communication manager 120 may determine that the second operation is to be performed in the second thread on the second parallel copy of the document model based on a task configuration corresponding to the second operation.

In some implementations, at block 420, based on determining that the second operation is to be performed in the second thread on the second parallel copy of the document model, the worker communication manager 120 may serialize the second operation based on the task configuration and transmit the second operation along with a checksum to the second thread. The checksum may represent a current revision of the first parallel copy of the document model, at a time when the second operation was requested.

Still referring to FIG. 4, at block 430, in response to determining that the second operation is to be performed, in the second thread, on the second parallel copy of the document model, the system performs the functions of blocks 440 and 450. In some implementations, the worker communication manager 120 of the document editor system 110 performs the functions of blocks 440 and 450 in response to determining that the second operation is to be performed, in the second thread, on the second parallel copy of the document model at block 420.

At block 440, the system determines that the revision of the first parallel copy of the document model no longer matches the revision of the second parallel copy of the document model. In some implementations, at block 440, the worker communication manager 120 of the document editor system 110 determines that the revision of the first parallel copy of the document model no longer matches the revision of the second parallel copy of the document model based on a comparison of the transmitted checksum from block 420 and a checksum that represents a current revision of the second parallel copy of the document model. In response to such comparison indicating that the two checksums do not match, the worker communication manager 120 determines that the revision of the first parallel copy of the document model no longer matches the revision of the second parallel copy of the document model.

At block 450, in response to determining that the revision of the first parallel copy of the document model no longer matches the revision of the second parallel copy of the document model, the system reloads, from a saved version, the first parallel copy of the document model and the second parallel copy of the document model, and removes the second operation from a queue. In some implementations, in response to determining at block 440 that the revision of the first parallel copy of the document model no longer matches the revision of the second parallel copy of the document model, the worker communication manager 120 of the document editor system 110 reloads, from a saved version, the first parallel copy of the document model and the second parallel copy of the document model, and removes the second operation from a queue. The worker communication manager 120 may also cause an error to be displayed on the user interface.

Figure 5:
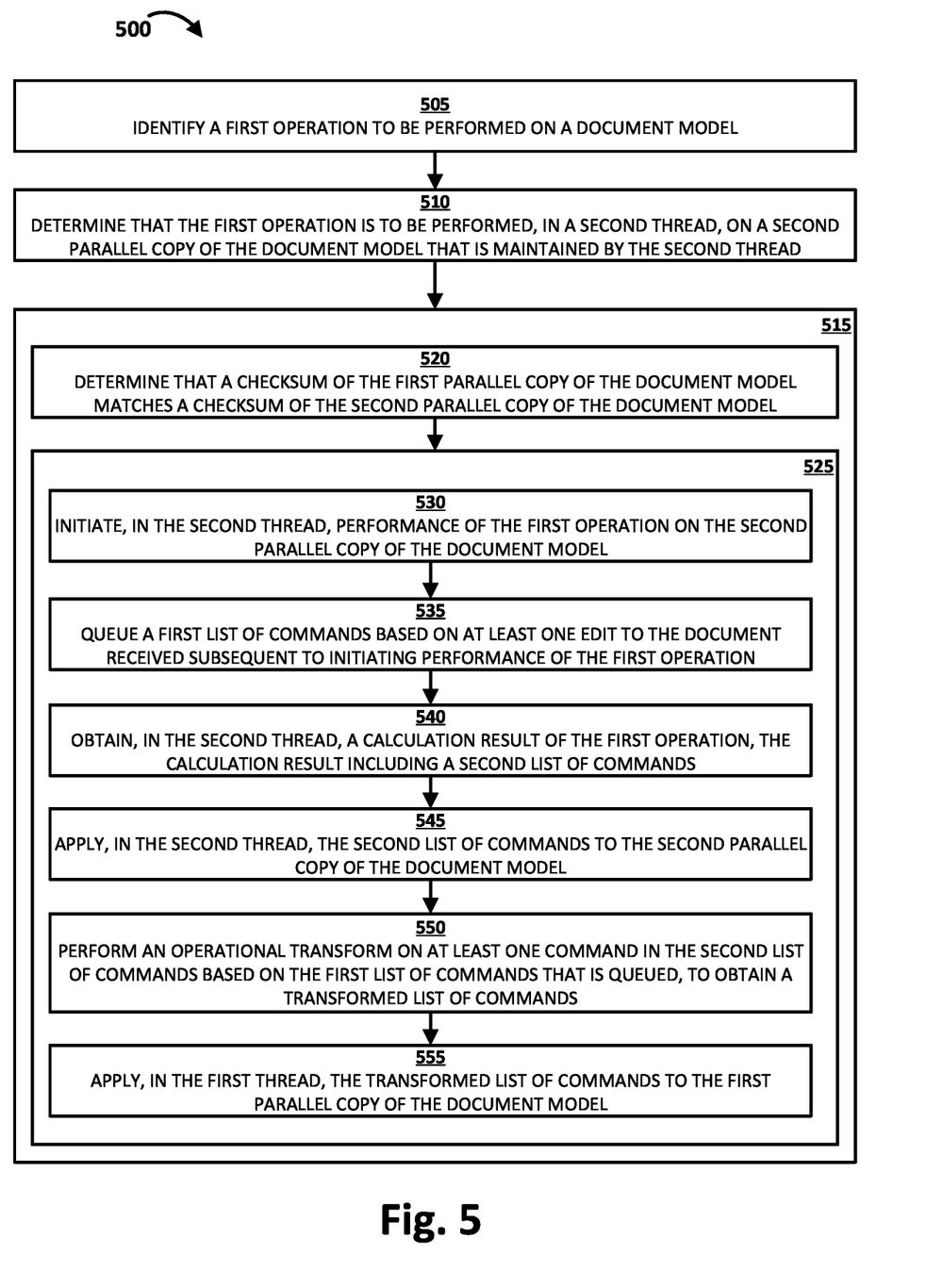
FIG. 5 depicts another flowchart illustrating an example method for practicing selected aspects of the present disclosure.

FIG. 5 depicts a flowchart illustrating an example method 500 of using operational transforms to perform operations on parallel copies of a document model. For convenience, the operations of the method 500 are described with reference to a system that performs the operations. This system of method 500 may include various components of various computer systems, such as one or more components of the document editor system 110. Moreover, while operations of method 500 are shown in a particular order, this is not meant to be limiting. One or more operations may be reordered, omitted, or added.

At block 505, the system may identify a first operation to be performed on a document model. In some implementations, in a first thread of a document editor application provided by the document editor system 110, a document may be rendered for display in a user interface that is displayed on a display of one of the clients 130-1, . . . , 130-n, using a first parallel copy of the document model that is maintained by the first thread. In some implementations, the worker communication manager 120 of the document editor system 110 may identify the first operation to be performed on the document model. The first operation may be an operation to be performed responsive to one or more edits received, via the user interface, from a user of a document editor application (e.g., a user may type a formula into a cell in a spreadsheet which may initiate a calculation operation, initiate a document save operation by selecting a "save" command on a menu, etc.). Alternatively, the first operation may be an operation to be performed responsive to one or more edits received from another user who is collaboratively editing the document using another instance of the document editor application provided by the document editor system 110. In other cases, the first operation may be initiated by the document editor application (e.g., an autosave operation or spellcheck operation that is performed at a predetermined interval, or in response to user edit(s)).

Still referring to block 505, in some implementations, the system may identify a second operation to be performed on the document model and a third operation to be performed on the document model, and determine that the second operation and the third operation are mergeable into the first operation. In some implementations, identifying the first operation to be performed on the document model may include, in response to determining that the second operation and the third operation are mergeable into the first operation, generating the first operation by merging the second operation and the third operation.

Still referring to block 505, in some implementations, the system may identify a second operation to be performed on the document model, the second operation preceding the first operation in a queue, and determine that the first operation may be reordered in the queue such that the first operation precedes the second operation. In some implementations, identifying the first operation to be performed on the document model may include, in response to determining that the first operation may be reordered in the queue such that the first operation precedes the second operation, reordering the first operation in the queue such that the first operation precedes the second operation.

Still referring to FIG. 5, at block 510, the system may determine that the first operation is to be performed, in a second thread, on a second parallel copy of the document model that is maintained by the second thread. In some implementations, the worker communication manager 120 of the document editor system 110 may determine that the first operation identified at block 510 is to be performed, in the second thread of the document editor application provided by the document editor system 110, on the second parallel copy of the document model that is maintained by the second thread.

In some implementations, the worker communication manager 120 may determine that the first operation is to be performed in the second thread on the second parallel copy of the document model based on a task configuration corresponding to the first operation. The task configuration may include information (e.g., metadata) about (1) what the operation will do to the document model, (2) how the operation should be serialized for transmission (e.g., from the first thread to the second thread), (3) whether or not the second thread (worker thread) is to be locked during performance of the operation, (4) whether or not execution of the operation in the second thread generates results to be sent back to the first thread (main thread), (5) whether or not the operation can be merged with another operation in the queue, and/or (6) whether or not the operation can be reordered with other operations in the queue.

In some implementations, at block 510, based on determining that the first operation is to be performed in the second thread on the second parallel copy of the document model, the worker communication manager 120 may serialize the first operation based on the task configuration and transmit the first operation along with a checksum to the second thread. The checksum may represent a current revision of the first parallel copy of the document model, at a time when the first operation was requested.

Still referring to FIG. 5, at block 515, in response to determining that the first operation is to be performed, in the second thread, on the second parallel copy of the document model, the system performs the functions of blocks 520 and 525. In some implementations, the worker communication manager 120 of the document editor system 110 performs the functions of blocks 520 and 525 in response to determining that the first operation is to be performed, in the second thread, on the second parallel copy of the document model at block 510.

At block 520, the system determines that a checksum of the first parallel copy of the document model matches a checksum of the second parallel copy of the document model. In some implementations, at block 520, the worker communication manager 120 of the document editor system 110 determines that the transmitted checksum of the first parallel copy of the document model from block 510 matches a checksum that represents a current revision of the second parallel copy of the document model. In some implementations, the checksum of the first parallel copy of the document model corresponds to a particular revision of the first parallel copy of the document model and the checksum of the second parallel copy of the document model corresponds to a particular revision of the second parallel copy of the document model.

At block 525, in response to determining that the checksum of the first parallel copy of the document model matches the checksum of the second parallel copy of the document model, the system performs the functions of blocks 530, 535, 540, 545, 550, and 555. In some implementations, the worker communication manager 120 of the document editor system 110 performs the functions of blocks 530, 535, 540, 545, 550, and 555 in response to determining that the checksum of the first parallel copy of the document model matches the checksum of the second parallel copy of the document model at block 520.

At block 530, the system initiates, in the second thread, performance of the first operation on the second parallel copy of the document model. In some implementations, the worker communication manager 120 of the document editor system 110 causes performance of the first operation to be initiated, in the second thread, on the second parallel copy of the document model.

At block 535, the system queues a first list of commands based on at least one edit to the document that is received subsequent to initiating the performance of the first operation. In some implementations, the worker communication manager 120 of the document editor system 110 queues the first list of commands based on at least one edit to the document that is received, from the user via the user interface, subsequent to initiating the performance of the first operation at block 530.

At block 540, the system obtains, in the second thread, a calculation result of the first operation, the calculation result including a second list of commands. In some implementations, the worker communication manager 120 of the document editor system 110 causes the calculation result of the first operation, including the second list of commands, to be obtained, in the second thread.

At block 545, the system applies, in the second thread, the second list of commands to the second parallel copy of the document model. In some implementations, the worker communication manager 120 of the document editor system 110 causes the second list of commands, obtained at block 540, to be applied, in the second thread, to the second parallel copy of the document model.

At block 550, the system performs an operational transform on at least one command in the second list of commands based on the first list of commands that is queued, to obtain a transformed list of commands. In some implementations, the worker communication manager 120 of the document editor system 110 causes the second list of commands to be serialized and transmitted to the first thread. The worker communication manager 120 may perform the operational transform on at least one command in the second list of commands that is transmitted to the first thread, based on the first list of commands that is queued at block 535, to obtain the transformed list of commands.

At block 555, the system applies, in the first thread, the transformed list of commands to the first parallel copy of the document model. In some implementations, the worker communication manager 120 of the document editor system 110 applies, in the first thread, the transformed list of commands, obtained at block 550, to the first parallel copy of the document model.

Figure 6:
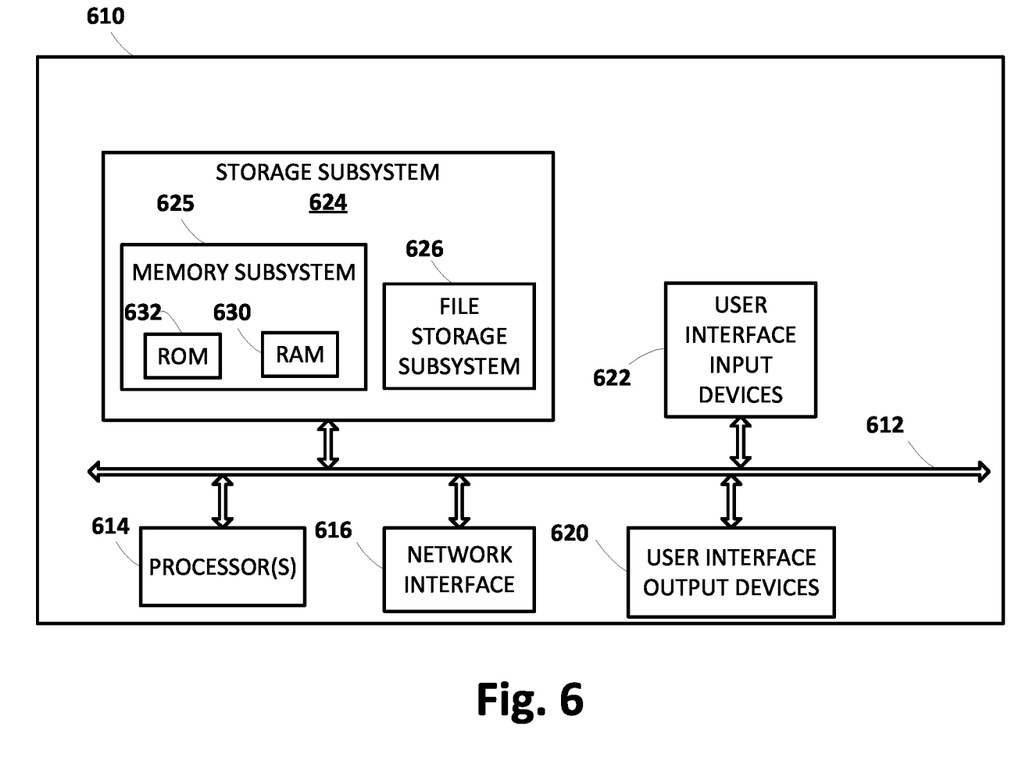
FIG. 6 illustrates an example architecture of a computing device.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods of FIGS. 2, 3, 4, and 5, as well as to implement various components depicted in FIG. 1.

These software modules are generally executed by processor 614 alone or in combination with other processors. The memory subsystem 625 included in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
  identifying a first operation to be performed on a document model, wherein, in a first thread, a document is rendered in a user interface using a first parallel copy of the document model that is maintained by the first thread;
  based on a task configuration corresponding to the first operation, determining that the first operation is to be performed, in a second thread, on a second parallel copy of the document model that is maintained by the second thread, before applying commands associated with the first operation to the first parallel copy of the document model that is used to render the document in the user interface; and in response to determining that the first operation is to be performed, in the second thread, on the second parallel copy of the document model:
determining that a revision of the first parallel copy of the document model matches a revision of the second parallel copy of the document model; and
in response to determining that the revision of the first parallel copy of the document model matches the revision of the second parallel copy of the document model:
performing, in the second thread, the first operation on the second parallel copy of the document model to obtain a calculation result of the first operation, the calculation result comprising a first list of commands;
applying, in the second thread, the first list of commands to the second parallel copy of the document model;
performing an operational transform on at least one command in the first list of commands based on queued user edits to the first parallel copy of the document model, the queued user edits comprising a second list of commands, to obtain a transformed list of commands; and
applying, in the first thread, the transformed list of commands to the first parallel copy of the document model.

2. The method according to claim 1, wherein determining that the revision of the first parallel copy of the document model matches the revision of the second parallel copy of the document model comprises determining that a first checksum based on the first parallel copy of the document model matches a second checksum based on the second parallel copy of the document model.

3. The method according to claim 1, wherein the queued user edits are based on edits to the document that are made by a user subsequent to identifying the first operation to be performed on the document model.

4. The method according to claim 1, further comprising:
identifying a second operation to be performed on the document model and a third operation to be performed on the document model; and
determining that the second operation and the third operation are mergeable into the first operation,
wherein identifying the first operation to be performed on the document model comprises, in response to determining that the second operation and the third operation are mergeable into the first operation, generating the first operation by merging the second operation and the third operation.

5. The method according to claim 1, further comprising:
identifying a second operation to be performed on the document model, wherein the second operation precedes the first operation in a queue; and
determining that the first operation may be reordered in the queue such that the first operation precedes the second operation,
wherein identifying the first operation to be performed on the document model comprises, in response to determining that the first operation may be reordered in the queue such that the first operation precedes the second operation, reordering the first operation in the queue such that the first operation precedes the second operation.

6. The method according to claim 1, further comprising:
identifying a second operation to be performed on the document model;
determining that the second operation is to be performed, in the second thread, on the second parallel copy of the document model; and
in response to determining that the second operation is to be performed, in the second thread, on the second parallel copy of the document model:
determining that the revision of the first parallel copy of the document model matches the revision of the second parallel copy of the document model; and
in response to determining that the revision of the first parallel copy of the document model matches the revision of the second parallel copy of the document model:
initiating, in the second thread, performance of the second operation on the second parallel copy of the document model;
determining that the performance of the second operation has not been completed within a threshold period of time; and
in response to determining that the performance of the second operation has not been completed within the threshold period of time, terminating the performance of the second operation.

7. The method according to claim 1, further comprising:
identifying a second operation to be performed on the document model;
determining that the second operation is to be performed, in the second thread, on the second parallel copy of the document model; and
in response to determining that the second operation is to be performed, in the second thread, on the second parallel copy of the document model:
determining that the revision of the first parallel copy of the document model no longer matches the revision of the second parallel copy of the document model; and
in response to determining that the revision of the first parallel copy of the document model no longer matches the revision of the second parallel copy of the document model, reloading, from a saved version, the first parallel copy of the document model and the second parallel copy of the document model, and removing the second operation from a queue.

8. The method according to claim 1, wherein:
the second thread is a worker thread; and
the task configuration corresponding to the first operation comprises information specifying whether or not the worker thread is to be locked during performance of the first operation.

9. A computer program product comprising one or more non-transitory computer-readable storage media having program instructions collectively stored on the one or more non-transitory computer-readable storage media, the program instructions executable to:
identify a first operation to be performed on a document model, wherein, in a first thread, a document is rendered in a user interface using a first parallel copy of the document model that is maintained by the first thread;
based on a task configuration corresponding to the first operation, determine that the first operation is to be performed, in a second thread, on a second parallel copy of the document model that is maintained by the second thread, before applying commands associated with the first operation to the first parallel copy of the document model that is used to render the document in the user interface; and in response to determining that the first operation is to be performed, in the second thread, on the second parallel copy of the document model:
  determine that a checksum of the first parallel copy of the document model matches a checksum of the second parallel copy of the document model; and
  in response to determining that the checksum of the first parallel copy of the document model matches the checksum of the second parallel copy of the document model:
    initiate, in the second thread, performance of the first operation on the second parallel copy of the document model;
    queue a first list of commands based on at least one edit to the document that is received subsequent to initiating the performance of the first operation;
    obtain, in the second thread, a calculation result of the first operation, the calculation result comprising a second list of commands;
    apply, in the second thread, the second list of commands to the second parallel copy of the document model;
    perform an operational transform on at least one command in the second list of commands based on the first list of commands that is queued, to obtain a transformed list of commands; and
    apply, in the first thread, the transformed list of commands to the first parallel copy of the document model.

10. The computer program product according to claim 9, wherein the checksum of the first parallel copy of the document model corresponds to a particular revision of the first parallel copy of the document model and the checksum of the second parallel copy of the document model corresponds to a particular revision of the second parallel copy of the document model.

11. The computer program product according to claim 9, the program instructions further being executable to:
  identify a second operation to be performed on the document model and a third operation to be performed on the document model; and
  determine that the second operation and the third operation are mergeable into the first operation,
  wherein identifying the first operation to be performed on the document model comprises, in response to determining that the second operation and the third operation are mergeable into the first operation, generating the first operation by merging the second operation and the third operation.

12. The computer program product according to claim 9, the program instructions further being executable to:
  identify a second operation to be performed on the document model, wherein the second operation precedes the first operation in a queue; and
  determine that the first operation may be reordered in the queue such that the first operation precedes the second operation,
  wherein identifying the first operation to be performed on the document model comprises, in response to determining that the first operation may be reordered in the queue such that the first operation precedes the second operation, reordering the first operation in the queue such that the first operation precedes the second operation.

13. The computer program product according to claim 9, the program instructions further being executable to:
  identify a second operation to be performed on the document model;
  determine that the second operation is to be performed, in the second thread, on the second parallel copy of the document model; and
  in response to determining that the second operation is to be performed, in the second thread, on the second parallel copy of the document model:
    determine that the revision of the first parallel copy of the document model matches the revision of the second parallel copy of the document model; and
    in response to determining that the revision of the first parallel copy of the document model matches the revision of the second parallel copy of the document model:
      initiate, in the second thread, performance of the second operation on the second parallel copy of the document model;
      determine that the performance of the second operation has not been completed within a threshold period of time; and
      in response to determining that the performance of the second operation has not been completed within the threshold period of time, terminate the performance of the second operation.

14. The computer program product according to claim 9, the program instructions further being executable to:
  identify a second operation to be performed on the document model;
  determine that the second operation is to be performed, in the second thread, on the second parallel copy of the document model; and
  in response to determining that the second operation is to be performed, in the second thread, on the second parallel copy of the document model:
    determine that the revision of the first parallel copy of the document model no longer matches the revision of the second parallel copy of the document model; and
    in response to determining that the revision of the first parallel copy of the document model no longer matches the revision of the second parallel copy of the document model, reload, from a saved version, the first parallel copy of the document model and the second parallel copy of the document model, and remove the second operation from a queue.

15. A system comprising:
  a processor, a computer-readable memory, one or more computer-readable storage media, and program instructions collectively stored on the one or more computer-readable storage media, the program instructions executable to:
  identify a first operation to be performed on a document model, wherein, in a first thread, a document is rendered in a user interface using a first parallel copy of the document model that is maintained by the first thread;
  based on a task configuration corresponding to the first operation, determine that the first operation is to be performed, in a second thread, on a second parallel copy of the document model that is maintained by the second thread, before applying commands associated with the first operation to the first parallel copy of the document model that is used to render the document in the user interface; and in response to determining that the first operation is to be performed, in the second thread, on the second parallel copy of the document model:
    determine that a revision of the first parallel copy of the document model matches a revision of the second parallel copy of the document model; and
    in response to determining that the revision of the first parallel copy of the document model matches the revision of the second parallel copy of the document model:
        perform, in the second thread, the first operation on the second parallel copy of the document model to obtain a calculation result of the first operation, the calculation result comprising a first list of commands;
        apply, in the second thread, the first list of commands to the second parallel copy of the document model;
        perform an operational transform on at least one command in the first list of commands based on queued user edits to the first parallel copy of the document model, the queued user edits comprising a second list of commands, to obtain a transformed list of commands; and
        apply, in the first thread, the transformed list of commands to the first parallel copy of the document model.

16. The system according to claim 15, wherein determining that the revision of the first parallel copy of the document model matches the revision of the second parallel copy of the document model comprises determining that a first checksum based on the first parallel copy of the document model matches a second checksum based on the second parallel copy of the document model.

17. The system according to claim 15, wherein the queued user edits are based on edits to the document that are made by a user subsequent to identifying the first operation to be performed on the document model.

18. The system according to claim 15, wherein the program instructions are further executable to:
    identify a second operation to be performed on the document model and a third operation to be performed on the document model; and
    determine that the second operation and the third operation are mergeable into the first operation,
        wherein identifying the first operation to be performed on the document model comprises, in response to determining that the second operation and the third operation are mergeable into the first operation, generating the first operation by merging the second operation and the third operation.

19. The system according to claim 15, wherein the program instructions are further executable to:
    identify a second operation to be performed on the document model, wherein the second operation precedes the first operation in a queue; and
    determine that the first operation may be reordered in the queue such that the first operation precedes the second operation,
        wherein identifying the first operation to be performed on the document model comprises, in response to determining that the first operation may be reordered in the queue such that the first operation precedes the second operation, reordering the first operation in the queue such that the first operation precedes the second operation.

20. The system according to claim 15, wherein the program instructions are further executable to:
    identify a second operation to be performed on the document model;
    determine that the second operation is to be performed, in the second thread, on the second parallel copy of the document model; and
    in response to determining that the second operation is to be performed, in the second thread, on the second parallel copy of the document model:
        determine that the revision of the first parallel copy of the document model matches the revision of the second parallel copy of the document model; and
        in response to determining that the revision of the first parallel copy of the document model matches the revision of the second parallel copy of the document model:
            initiate, in the second thread, performance of the second operation on the second parallel copy of the document model;
            determine that the performance of the second operation has not been completed within a threshold period of time; and
            in response to determining that the performance of the second operation has not been completed within the threshold period of time, terminate the performance of the second operation.

* * * * *